United States Patent [19]

Sipinen et al.

[11] Patent Number: 5,216,043

[45] Date of Patent: Jun. 1, 1993

[54] DEGRADABLE THERMOPHASTIC COMPOSITIONS AND BLENDS WITH NATURALLY BIODEGRADABLE POLYMERS

[75] Inventors: Alan J. Sipinen, North Oaks, Minn.; Jobst T. Jaeger, Kaarst, Fed. Rep. of Germany; Denise R. Rutherford, Oakdale; Elizabeth C. Edblom, Minneapolis, both of Minn.

[73] Assignee: Minnesota Mining and Manufacturing Company, St. Paul, Minn.

[21] Appl. No.: 806,769

[22] Filed: Dec. 12, 1991

[51] Int. Cl.$^5$ ............................ C08K 5/56; C08K 5/09
[52] U.S. Cl. ................................ 523/126; 523/125; 524/322; 524/395
[58] Field of Search ............... 524/322, 395; 523/126, 523/125

[56] References Cited

U.S. PATENT DOCUMENTS

| | | | |
|---|---|---|---|
| 3,840,512 | 10/1974 | Brackman | 260/94.9 GC |
| 3,864,293 | 2/1975 | Miyoshi et al. | 523/126 |
| 3,921,333 | 11/1975 | Clendinning et al. | 47/37 |
| 4,016,117 | 4/1977 | Griffin | 260/17.4 |
| 4,038,228 | 7/1977 | Taylor | 524/381 |
| 4,067,836 | 1/1978 | Potts et al. | 522/66 |
| 4,101,720 | 7/1978 | Taylor et al. | 526/3 |
| 4,324,709 | 4/1982 | Griffin | 523/210 |
| 4,420,576 | 12/1983 | Griffin | 524/47 |
| 4,931,488 | 6/1990 | Chiquet | 523/126 |
| 5,059,642 | 10/1991 | Jane et al. | 524/52 |

Primary Examiner—Paul R. Michl
Assistant Examiner—LaVonda DeWitt
Attorney, Agent, or Firm—Gary L. Griswold; Roger R. Tamte; William J. Bond

[57] ABSTRACT

The invention provides a compostable thermoplastic polymer composition comprising a thermoplastic polymer, a transition metal salt selected from cobalt, manganese, copper, cerium, vanadium and iron, and a fatty acid or ester having 10 to 22 carbon atoms providing unsaturated species and free acid. The composition will oxidatively degrade to an embrittled state within at least 14 days at 60° C. and a relative humidity of at least eighty percent.

38 Claims, No Drawings

DEGRADABLE THERMOPHASTIC COMPOSITIONS AND BLENDS WITH NATURALLY BIODEGRADABLE POLYMERS

BACKGROUND AND FILED OF THE INVENTION

This invention relates to a novel polymeric blend having enhanced environmental degradability properties comprising a non-biodegradable thermoplastic polymer.

There are numerous patents dealing with enhancing the degradability of conventional non-biodegradable polymers such as polyolefins by use of additive systems. These additive systems are quite frequently designed to enhance the polymers degradability in a specific type of environment and over a specific length of time. For example, U.S. Pat. No. 3,840,512 (Brackman) exemplifies prodegradant systems comprising ferric stearate with various free fatty acids, both saturated and unsaturated. Manganese stearate is also exemplified in a system with stearic acid. Brackman states that thermoplastic films (e.g., polyolefin films) formed with these prodegradant systems will embrittle when exposed to artificially UV-activated irradiation at times ranging from 2 to 35 days. It is specifically stated that the nature of the hydrocarbon group on the fatty acid does not have a large influence on the rate of UV degradation. Brackman does not address the issue of degradability in other environments, such as in a compost environment. A patent dealing with a similar prodegradant system, U.S. Pat. No. 4,067,836 (Potts et al.), discloses adding a transition metal salt, an auto-oxidative susceptible additive, and an anti-oxidant to polyethylene. The only exemplified auto-oxidative susceptible additives were polypropylene and polyethylene oxide (which did not work as acceptably as polypropylene). The degradation of the samples was tested by exposure to an artificial solar light spectral distribution. The degradability characteristics of these prodegradant additives were never demonstrated in other environments such as a compost environment. Generally, additive systems as described above, designed to make a polymer degrade when exposed to environmental radiation, have proved of doubtful practical utility. Only a relatively small portion of the waste stream is ever exposed to sunlight, even for short periods of time.

In U.S. Pat. No. 3,921,333 (Clendinning, et al.) it is proposed to make the composition of Potts, et al., discussed above, degradable in a soil type environment by adding a biodegradable polymer such as poly(caprolactone). The invention described is allegedly useful for materials such as transplanting containers, mulch film and the like. Again, only a small portion of the plastic in the waste stream is ever used in such environments and as such the compositions described are of limited applicability based on their limited intended use.

U.S. Pat. No. 4,038,228 (Taylor, et al.) describes placing a transition metal salt of an unsaturated organic acid or ester into a polymer film (e.g., polyethylene or polypropylene) to enhance its degradability in the absence of sunlight. The transition metal salts discussed are identical to many of those exemplified in the above Clendinning et al. and Potts et al. patents; however, they are exemplified at extremely high concentrations. The exemplified film degrades to an embrittled condition within three days at room temperature. Such a film is of doubtful utility as it would likely degrade before use and the exemplified high concentrations of cobalt used would create an extremely costly and toxic material.

A more recent patent, U.S. Pat. No. 4,931,488 (Chiquet), describes a polymer (e.g., polyethylene) composition which allegedly will degrade when exposed to heat, ultraviolet radiation, sunlight, or under composting conditions. The prodegradant system broadly described consists of a biodegradable substance such as starch, an iron compound and a fatty acid or fatty acid ester, optionally with copper stearate. The exemplified films, however, are limited to polyethylene blended with ferric stearate and soya oil, with a minor proportion of cupric stearate in certain examples. Although it is alleged that these compositions are tested under composting conditions, the conditions are not actually set forth and the reported films do not appear to degrade for up to twenty weeks, a situation which would be unacceptable in most commercial composting situations where peak temperatures are reached for only approximately two weeks.

As can be seen the art continues to seek to improve the degradability of conventional plastic films in various environments by use of additive prodegradant systems. These systems have been designed to provide degradability properties in a wide variety of environmental conditions. Systems that have been found to work in one set of conditions do not necessarily work under a separate set of conditions which can vary from a dry sunlit exposure to the wet, dark, and relatively infertile conditions of a composter. Applicants have found a composition which will rapidly degrade under conditions of a typical commercial composting unit yet provide an article such as a film which is functional under normal use conditions. A typical composting unit generally is exposed to peak temperatures of greater than 60° C. for periods of approximately two weeks or less. During that period, the organic matter in the composter is generally exposed to an extremely high humidity, generally close to one hundred percent. These humidity conditions are generally favorable for biological attack, however, they are generally inhospitable to oxidative type degradations where transition metal salts are typically employed.

BRIEF SUMMARY OF THE INVENTION

The present invention provides a degradable composition comprising a thermoplastic polymer, a transition metal salt selected from salts of cobalt, manganese, copper, cerium, vanadium and iron, and a fatty acid or ester having ten to twenty-two carbon atoms comprised predominantly of unsaturated species and comprised at least partially of free acid. The composition is designed so that it will oxidatively degrade to form an embrittled polymer within at least fourteen days at 60° C. and at a relative humidity of at least eighty percent. After this peak period, the temperature of a typical compost unit slowly declines, decreasing the rate of oxidative degradation, often quite dramatically.

DETAILED DESCRIPTION

Generally, the invention is directed to a compostable thermoplastic polymer composition comprising a thermoplastic polymer containing a prodegradant system of an auto-oxidant of an unsaturated fatty acid or ester having ten to twenty-two carbon atoms, and certain transition metal salts.

The fatty acid or ester is present in the polymer composition at a concentration of about 0.1 to 10 weight percent so as to provide a concentration of unsaturated species of greater than 0.1 weight percent and a concentration of free acid species greater than 0.1 percent by weight based on the total composition. Further included is a transition metal salt at a relatively low concentration of 5 to 500 ppm of the metal itself where the transition metal is selected from the group comprising cobalt, manganese, copper, cerium, vanadium and iron, preferably cobalt, manganese, copper or cerium. The composition is formulated such that it will oxidatively degrade, preferably to an embrittled state, within fourteen days at a temperature of about 60° C. and relative humidity of 80 percent or more, preferably 100 percent after a reasonable shelf life. Generally, it is expected that the composition will have to be shelf-stable for a time ranging from one week to 12 months. As the degradation occurs slowly, even at room temperature, for longer shelf-life products, generally lower concentrations of the transition metal or fatty acid (free acid and/or unsaturated species) will be required to provide a compostable film at the film's intended mean shelf life. Conversely, higher concentrations of the metal or fatty acid species will be required for films with short-intended shelf lives.

Thermoplastic polymers suitable for use with the present prodegradant system include polyolefins such as polyethylene, polypropylene, polybutylene or poly(4-methyl-1-pentene). Other suitable polymers include poly(vinyl acetates), polyesters, polyurethanes, poly(vinyl alcohols), polyamides, polystyrenes or polyamines. Copolymers and blends are also suitable. Preferably, the polymer employed is a saturated thermoplastic polymer such as polyethylene or polypropylene suitable for extrusion or coextrusion. Most preferred are polypropylenes or polypropylene blends, such as blends of polypropylene and polyethylene-based polymers and copolymers.

The transition metal salts include those discussed, for example, in U.S. Pat. No. 4,067,836, which salts can be ones having organic or inorganic ligands. Suitable inorganic ligands include chlorides, nitrates, sulfates, and the like. Preferred are organic ligands such as octanoates, acetates, stearates, oleates, naphthenates, linoleates, tallates and the like. Although a wide range of transition metals have been disclosed in the art as suitable for various prodegradant systems, for a compostable polymeric film it has been found that the transition metal must be selected from the group comprising cobalt, manganese, copper, cerium, vanadium and iron in a concentration range of from 5 to 500 ppm and preferably cobalt, manganese, copper and cerium for most polymers. Preferably, the transition metal is used in a concentration of from 5 to 200 ppm which is highly desirable as such metals are generally undesirable in large concentrations. High transition metal concentrations in compost material can lead to toxicological and environmental concerns due to groundwater leaching of these metals into the surrounding environment. Further, higher transition metal concentrations can yield unstable films with the invention prodegradant system.

Oxidative degradation in a typical composter occurs under substantially saturated atmospheric humidity conditions. The plastic on its external face will normally see a humidity of approximately 100 percent. These are extremely severe conditions for oxidative degradation and it has been found that the prodegradant systems described in the art are not suitable for adequate degradation of plastics under these conditions.

It is found that adequate degradation under typical composting conditions requires salts of the above mentioned transition metals in combination with acid moieties such as those found in unsaturated fatty acids. It has also been found that unsaturation in the fatty acid, or an admixed fatty acid ester or natural oil, is required to produce adequate degradation with the proper transition metal compound. Preferably, this unsaturated fatty acid is present in the polymer composition at concentrations of at least 0.1 weight percent of the composition, preferably at least 0.25 weight percent, and most preferably at least 0.5 weight percent. Also suitable are blends of fatty acids and fatty acid esters or oils as long as the amount of free acid and unsaturated species are generally equivalent to the above described ranges for a pure fatty acid containing composition.

Generally, it has been found that unsaturated fatty acids having 10 to 22 carbon atoms function well in providing the degradation rate required for a compostable material. Unsaturation such as found in abnormal oils is found to be preferred. Such unsaturation includes two or more double bonds in the fatty acid or ester chains. Generally, unsaturation where two of the double bonds are separated by two single bonds, resulting in a doubly allylic carbon atom, has been found to be highly desirable, although conjugated double bonds are also preferred. Samples of materials which contain doubly allylic carbon atoms include linseed oil, linoleic acid and linolenic acid. An example of a common conjugated fatty acid is eleostearic acid found in high concentration, in the ester form, in natural tung oil. Other natural oils containing fairly high amounts of unsaturation include fish oils such as sardine, cod liver, manhaden, and herring oil. Fatty acids derived from these naturally occurring oils containing high percentages of unsaturation are also suitable as auto-oxidative accelerating components.

Also suitable are fatty acid derivatives, substituted fatty acids or derivatives or corresponding reduction products such as amines or alcohols and the like, although substitutions should not be adjacent to allylic or conjugated double bonds or other sources of unsaturation as they tend to reduce the effectiveness of such fatty acids and derivatives. Generally, other acids have been found to be unsuitable, including dicarboxylic fatty acids. However, additive amounts of rosin acids such as Foral ™ AX have been found to be useful in some instances.

Preferably, the composition further includes an anti-oxidant. Anti-oxidants help stabilize the polymer during extrusion operations during the formation of a film or other article as well as help provide a suitable shelf life for the degradable articles. Any suitable anti-oxidants used with the conventional base polymer are acceptable including such typical anti-oxidants such as sterically hindered phenols, aryl amines, thioureas, thiocarbamates, thioetheresters, phosphites, or the like. Illustrative anti-oxidants can be found, for example, in U.S. Pat. No. 4,067,836. Preferably the anti-oxidant is present in a concentration of approximately 0.1 weight percent or more based on the total polymer composition.

The compostable polymer composition also preferably includes a naturally biodegradable polymer such as poly(caprolactone), poly(lactic acid), poly(hydroxybutyrate-valerate), poly(ethylene adipate), poly(vinyl alcohol), modified starch/oleofin copolymers, poly(propylene oxide), and poly(ethylene oxide). Other suitable biodegradable polymers are generally well known and are described in, for example, U.S. Pat. No. 3,921,333. These biodegradable polymers assist in further biodegradation of the composition following the transition metal salt catalyzed oxidative degradation, which reduces the base thermoplastic resin to a lower molecular weight substance. Although these biodegradable polymers alone can be broken down fairly rapidly in any compost type environment, their physical properties are generally inferior to those of conventional thermoplastic films. Further, their costs are often quite prohibitive for use in typical commercial applications. However, blended with conventional thermoplastic materials, such as polyolefins, these biodegradable polymers should assist in the biological breakdown of the articles following the catalytic embrittlement period. Generally, the naturally biodegradable polymer can be included in amounts from 5 to 50 weight percent of the composition, preferably these biodegradable polymers are used at from 5 to 25 weight percent.

Other conventional additives can be added to the polymer composition including fillers, dyes, pigments, anti-blocking agents or the like.

The invention composition finds particularly advantageous use for producing films or fibers due to the composition's ability to be extruded without significantly affecting performance. With such extruded films or fibers, the fatty acid species preferably are predominantly $C_{12}$ to $C_{22}$ species. These fatty acid species are generally more tolerant of typical extrusion conditions. However, the composition can be used in other extruded articles or non-extruded articles.

Typical uses for the composition as extruded films or fibers include disposable items which would in use be at ambient conditions or below, or exposed to elevated temperatures for a relatively short period of time. This would include trash bags, disposable diaper components (e.g., diaper backsheets, polymer film components, extruded nonwoven fiber webs, and the like), freezer bags, disposable medical bags or components, disposable garments, hygiene articles, internal packaging films, etc.

The compositions could also be used in coextruded or laminated articles where degradation additives are included in all the layers or regions. However, a multilayer article can include layers where degradation additives are not included. However, the layer in this instance should be a naturally biodegradable polymer and/or extremely thin so as not to significantly hinder embrittlement. These layers without the degradation additives could be applied by coextrusion, lamination, or conventional coating techniques.

The following examples are provided to illustrate presently contemplated preferred embodiments and the best mode for practicing the invention, but are not intended to be limiting thereof:

TEST PROCEDURES

Embrittlement

Embrittlement was determined by hand testing the samples. A state of embrittlement was defined as the time at which the samples had little or no tear or tensile strength remaining or would crumble when folded. With softer or lower melting polymers, such as polyethylene, the films did not generally disintegrate or crumble but rather became soft and lost all tensile strength.

Compost conditions were simulated by placing the films into a jar of water which was then buffered to a pH of 6 by a phosphate buffer and heated to various temperatures. Samples were removed at various times and dried and tested for embrittlement. Generally, these samples were tested at intervals of 12-24 hours.

Film Preparation

All films were prepared on a ¾" (1.9 cm) HAAKE TM extruder having a L/D ratio of 24:1 using 3 zones having temperatures of 390° F. (199° C.), 410° F. (210° C.), and 430° F. (221° C.) with a die temperature of 430° F. The film was formed on a casting roll at a temperature of 70° F. (21° C.). The films were taken off the roll so as to have a total thickness of 4.0 mils (102μ).

EXAMPLES 1-14

The films were prepared as described above using 566 parts per million of manganese stearate (i.e., 50 ppm manganese), and 1 weight percent of the indicated natural oils (Table 1) in polypropylene (a Shell 5A95 9.5 MFI homopolymer with an anti-oxidant available from Shell Chemical Co., Houston, Tex.) with the exception of Example 14 which utilized 2 percent of a styrene-butadiene rubber (SBR) as an auto-oxidant. The SBR was incorporated as a concentrate consisting of 28% SBR in 72% Shell 7C04N PP/PE impact copolymer (35 MFI, 9% polyethylene).

Two inch (5 cm) by six inch (15 cm) samples were placed in trays in dry forced air ovens. The trays were removed periodically and the films were creased by hand. Embrittlement was defined as the point in time when the samples would first crack and fall apart when creased. In the Tables provided the greater than sign indicates that the testing was terminated at the noted time (in hours). The samples were tested at 60° C., 70° C., and 88° C. as noted in Table 1 below.

TABLE 1

| Example | Auto-Oxidant | Time to Embrittlement (Hours) | | |
|---|---|---|---|---|
| | | 88° C. | 70° C. | 60° C. |
| 1 | Coconut Oil | 55 | 257 | 600 |
| 2 | Almond Oil | 12 | 202 | 317 |
| 3 | Olive Oil | 36 | 202 | 410 |
| 4 | Castor Oil | 55 | 179 | 317 |
| 5 | Safflower Oil | 31 | 161 | 245 |
| 6 | Soy Oil | 5 | 161 | 291 |
| 7 | Wheat Germ Oil | 4.5 | 161 | 358 |
| 8 | Walnut Oil | 6 | 130 | 291 |
| 9 | Dehydrated Castor Oil | 4.5 | 130 | 317 |
| 10 | Cod Liver Oil | 12 | 94 | 190 |
| 11 | Sardine Oil | 11 | 57 | 149 |
| 12 | Tung Oil | 7 | 53 | 150 |
| 13 | Linseed Oil | 6 | 20 | 59 |
| 14 | SBR | 26 | 77 | 145 |

All samples were approximately 1-2 weeks old when tested. The table indicates that the oils containing more highly unsaturated fatty acid esters provide the fastest high temperature degradation at typical dry conditions.

EXAMPLES 15-28

Various films were prepared and tested, as described above for Examples 1-14, using 1 weight percent of various fatty acids and fatty acid derivatives as the auto-oxidants. All auto-oxidants were $C_{18}$ fatty acids or fatty acid derivatives with 0, 1 and 2 double bonds (stearic, oleic and linoleic, respectively). The samples were approximately 1-2 weeks old when tested. The results are given in Table 2. The results indicate that substitution of the fatty acid generally does not significantly effect the degradation rate of compositions using derivatives of typical fatty acids.

TABLE 2

| Example | Auto-Oxidant | 88° C. | 70° C. | 60° C. |
|---|---|---|---|---|
| 15 | Stearic Acid (C18,0 DB) | 8-23 | 217 | 155 |
| 16 | Methyl Stearate | >800 | >800 | >800 |
| 17 | Ethyl Stearate | >800 | >800 | >800 |
| 18 | Propyl Stearate | 8-23 | 103 | 155 |
| 19 | Stearamide | 8-23 | 265 | 348 |
| 20 | Stearylamide | 8-23 | >800 | >800 |
| 21 | Stearyl Alcohol | 8-23 | 103 | 204 |
| 22 | Oleic Acid (C18,1 DB) | 3.5 | 9-23 | 48 |
| 23 | Propyl Oleate | 8-23 | 48 | 120 |
| 24 | Oleamide | 30 | 48 | 102 |
| 25 | Oleyl Alcohol | 8-23 | 38 | 102 |
| 26 | Linoleic Acid (C18,2 DB) | 5.5 | 23 | 38 |
| 27 | Methyl Linoleate | 10 | 38 | 78 |
| 28 | Propyl Linoleate | 10 | 38 | 116 |

The examples were also checked for degradation after storing at room temperature for 8.5 months. Examples 22 and 24-28 showed signs of embrittlement, however, Examples 15-21 and 23 were not embrittled at this date.

EXAMPLES 29-62

Samples were prepared, as described above for Examples 1-14, using various polypropylenes (unstabilized and stabilized, i.e., commercially available resins with anti-oxidants), stabilized polyethylenes and blends thereof as indicated in Table 3 using the procedure outlined above. All metals were added as metal stearates to provide the indicated concentration of metal. Samples were then placed in water jars and buffered to a pH of 6 using a phosphate buffer. The samples were tested for embrittlement as described above except for the polyethylenes and blends which were tested for softness and loss of tensile strength. The time for embrittlement is shown in Table 3 below. The samples were tested within one week after extrusion.

TABLE 3

| Ex. No. | Composition | 88° C. Hrs. | 60° C. Hrs. | 49° C. Hrs. |
|---|---|---|---|---|
| 29 | 5A95 PP + 50 ppm Co + 4% Oleic acid, | <16 | 43 | 85 |
| 30 | Unst. PP + 50 ppm Mn + 4% Oleic acid | 16 | 40 | 85 |
| 31 | Unst. PP + 50 ppm Fe + 4% Oleic acid | 16 | 65 | 88 |
| 32 | 5A95 PP + 50 ppm Co + 2% Linseed oil + 2% Stearic acid | 20 | 88 | 140 |
| 33 | Unst. PP + 50 ppm Fe + 2% Linseed oil + 2% Stearic acid | 40 | 85 | 85 |
| 34 | 5A95 PP + 50 ppm Mn + 4% Oleic acid | 40 | 110 | 195 |
| 35 | Unst. PP + 50 ppm Fe + 4% Stearic acid | 40 | 134 | 165 |
| 36 | 5A95 PP + 50 ppm Mn + 4% Linoleic acid | 42 | 46 | 88 |
| 37 | 5A95 PP + 50 ppm Mn + 2% Linseed oil + 2% Oleic acid | 42 | 96 | 120 |
| 38 | 5A95 PP + 50 ppm Mn + 2% Linseed oil + 2% Lauric acid | 42 | 115 | 190 |
| 39 | Unst. PP + 50 ppm Mn + 2% Linseed oil + 2% Stearic acid | 42 | 115 | 190 |
| 40 | 5A95 PP + 50 ppm Mn + 2% Linseed oil + 2% Stearic acid | 42 | 195 | 195 |
| 41 | 6-166 PP/PE + 50 ppm Mn + 4% Oleic acid | 65 | 120 | 195 |
| 42 | 5A95 PP + 50 ppm V + 2% Linseed oil + 2% Stearic acid | 65 | 195 | 190 |
| 43 | 5A95 PP + 50 ppm Mn + 2% Tung Oil + 2% Stearic acid | 65 | 260 | 595 |
| 44 | 7C50 PP/PE + 50 ppm Mn + 4% Oleic acid | 88 | 115 | 195 |
| 45 | 7C50 PP/PE + 50 ppm Mn + 2% Linseed oil + 2% Stearic acid | 88 | 165 | 285 |
| 46 | Unstabilized 5A95 PP powder (100%) | 88 | 326 | 400 |
| 47 | 6180 HDPE + 50 ppm Mn + 2% Linseed oil + 2% Stearic acid | 96 | 235 | 475 |
| 48 | 5A95 PP + 50 ppm Fe + 2% Linseed oil + 2% Stearic acid | 110 | 650 | >700 |
| 49 | 1550P LDPE/5A95 PP(77/19) + 50 ppm Mn + 4% Oleic acid | 134 | 231 | 310 |
| 50 | 5A95 PP + 50 ppm Ce + 2% Linseed oil + 2% Stearic acid | 260 | 400 | >700 |
| 51 | 1550P LDPE/5A95 PP(77/19) + 50 ppm Mn + 2% Linseed oil + 2% Stearic acid | 260 | 550 | >700 |
| 52 | 1550P LDPE + 50 ppm Mn + 4% Oleic acid | 260 | >700 | >700 |
| 53 | 1550P LDPE + 50 ppm Mn + 2% Linseed oil + 2% Stearic acid | 305 | >700 | >700 |
| 54 | 6180 HDPE + 50 ppm Mn + 4% Oleic acid | 400 | >700 | >700 |
| 55 | 5A95 PP + 50 ppm Mn + 2% Coconut oil + 2% Stearic acid | 405 | >700 | >700 |
| 56 | 5A95 PP + 50 ppm Ce + 4% Oleic acid | 455 | >700 | 400 |
| 57 | 5A95 PP + 50 ppm V + 4% Oleic acid | 545 | >700 | >700 |
| 58 | 6-166 PP/PE + 50 ppm Mn + 2% Linseed oil + 2% Stearic acid | 575 | 350 | >700 |
| 59 | 5A95 PP + 50 ppm Mn + 4% β-methylcinnamic acid | >700 | >700 | >700 |
| 60 | 5A95 PP + 50 ppm Mn + 4% Lauric acid | >700 | >7000 | >700 |
| 61 | 5A95PP + 50 ppm Fe + 4% Oleic acid | >700 | >700 | >700 |
| 62 | 5A95 PP + 50 ppm Mn + 4% Stearic acid | >700 | >700 | >700 |

1 5A95 is Shell 5A95
2 unstabilized PP is a 9.0 MFI material available from Shell
3 7C50 PP/PE is Shell 7C50, 8.0 MFI and 8% PE
4 6180 HDPE is NHD 6180 available from Quantum Co., Rolling Meadows, IL with an MI of 1.15 and a density of 0.960.
5 1550P LDPE is Tenite ™, 3.5 MFI and 0.9 density, available from Eastman Chemical Products, Kingsport, TN
6 6-166 PP/PE is random copolymer available from Shell, 8.0 MFI.

Samples from Examples 29-62 were stored at room temperature for approximately 1900 hours and checked for embrittlement. Examples 29-41 samples showed evidence of embrittlement, while Examples 42-62 samples showed no signs of embrittlement.

Table 4 shows the embrittlement time for Examples 29-62 samples in a dry oven.

TABLE 4

| Ex. No. | Composition | 88° C. Hrs. | 70° C. Hrs. | 60° C. Hrs. | 49° C. Hrs. |
|---|---|---|---|---|---|
| 29 | 5A95 PP + 50 ppm Co + 4% Oleic acid | 2 | 3 | 9 | 16 |
| 30 | Unst. PP + 50 ppm Mn + 4% Oleic acid | 1 | 3 | 7 | 18 |
| 31 | Unst. PP + 50 ppm Fe + 4% Oleic acid | 3.5 | 11 | 33 | 72 |
| 32 | 5A95 PP + 50 ppm Co + 2% Linseed oil + 2% Stearic acid | 2 | 9 | 30 | 72 |
| 33 | Unst. PP + 50 ppm Fe + 2% Linseed oil + 2% Stearic acid | 4.5 | 24 | 85 | 221 |
| 34 | 5A95 PP + 50 ppm Mn + 4% Oleic acid | 2 | 7 | 20 | 48 |
| 35 | Unst. PP + 50 ppm Fe + 4% Stearic acid | 6 | 18 | 60 | 143 |
| 36 | 5A95 PP + 50 ppm Mn + 4% Linoleic acid | 1.5 | 5 | 16 | 40 |
| 37 | 5A95 PP + 50 ppm Mn + 2% Linseed oil + 2% Oleic acid | 2 | 8 | 30 | 54 |
| 38 | 5A95 PP + 50 ppm Mn + 2% Linseed oil + 2% Lauric acid | 2 | 7 | 20 | 55 |
| 39 | Unst. PP + 50 ppm Mn + 2% Linseed oil + 2% Stearic acid | 3 | 9.5 | 36 | 94 |
| 40 | 5A95 PP + 50 ppm Mn + 2% Linseed oil + 2% Stearic acid | 2 | 6 | 25 | 54 |
| 41 | 6-166 PP/PE + 50 ppm Mn + 4% Oleic acid | 6 | 22 | 46 | 97 |
| 42 | 5A95 PP + 50 ppm V + 2% Linseed oil + 2% Stearc acid | 17 | 84 | 335 | >800 |
| 43 | 5A95 PP + 50 ppm Mn + 2% Tung Oil + 2% Stearic acid | 2.5 | 9 | 30 | 90 |
| 44 | 7C50 PP/PE + 50 ppm Mn + 4% Oleic acid | 3.5 | 12 | 37 | 76 |
| 45 | 7C50 PP/PE + 50 ppm Mn + 2% Linseed oil + 2% Stearic acid | 3 | 10 | 36 | 76 |
| 46 | Unstabilized 5A95 PP powder (100%) | 22.5 | 108 | 385 | >800 |
| 47 | 6180 HDPE + 50 ppm Mn + 2% Linseed oil + 2% Stearic acid | 8 | 34 | 120 | 294 |
| 48 | 5A95 PP + 50 ppm Fe + 2% Linseed oil + 2% Stearic acid | 53 | 235 | >800 | >800 |
| 49 | 1550P LDPE/5A95 PP(77/19) + 50 ppm Mn + 4% Oleic acid | 12.5 | 69 | 284 | 294 |
| 50 | 5A95 PP + 50 ppm Ce + 2% Linseed oil + 2% Stearic acid | 7 | 34 | 130 | 294 |
| 51 | 1550P LDPE/5A95 PP(77/19) + 50 ppm Mn + 2% Linseed oil + 2% Stearic acid | 25.5 | 114 | 212 | 433 |
| 52 | 1550P LDPE + 50 ppm Mn + 4% Oleic acid | 82 | 290 | 60 | >800 |
| 53 | 1550P LDPE + 50 ppm Mn + 2% Linseed oil + 2% Stearic acid | 82 | 470 | 740 | >800 |
| 54 | 6180 HDPE + 50 ppm Mn + 4% Oleic acid | 22 | 47 | 120 | 221 |
| 55 | 5A95 PP + 50 ppm Mn + 2% Coconut oil + 2% Stearic acid | 3 | 16 | 62 | 150 |
| 56 | 5A95 PP + 50 ppm Ce + 4% Oleic acid | 22 | 24 | 60 | 97 |
| 57 | 5A95 PP + 50 ppm V + 4% Oleic acid | 22.5 | 90 | 165 | 294 |
| 58 | 6-166 PP/PE + 50 ppm Mn + 2% Linseed oil + 2% Stearic acid | 4.5 | 13 | 51 | 94 |
| 59 | 5A95 PP + 50 ppm Mn + 4% β-methylcinnamic acid | 11.5 | 185 | 240 | >800 |
| 60 | 5A95 PP + 50 ppm MN + 4% Lauric acid | 4 | 18 | 62 | 200 |
| 61 | 5A95 PP + 50 ppm Fe + 4% Oleic acid | 31.5 | 145 | 335 | 605 |
| 62 | 5A95 PP + 50 ppm Mn + 4% Stearic acid | 7 | 41 | 140 | 480 |

EXAMPLES 63-79

Samples were prepared using various polypropylenes (unstabilized and stabilized commercial polymers), stabilized polyethylenes and stabilized blends thereof as defined in Table 3 using the procedure outlined above. Samples were then placed in water jars and buffered to a pH of 6 using a phosphate buffer. The samples were tested for embrittlement as described above except for the polyethylenes and blends which were tested for softness and loss of tensile strength. The time for embrittlement is shown in Table 5 below. The samples were tested soon after extrusion.

TABLE 5

| Ex. No. | Composition | 88° C. Hrs. | 60° C. Hrs. | 49° C. Hrs. |
|---|---|---|---|---|
| 63 | 5A95 PP + 50 ppm Mn + 4% Erucic acid | 42 | 120 | 185 |
| 64 | 5A95 PP + 50 ppm Mn + 4% Linseed oil + 2% Euric acid | 42 | 113 | 190 |
| 65 | 5A95 PP + 50 ppm Mn + 4% Oleic acid | 45 | 120 | 210 |
| 66 | Unst. PP + 50 ppm Mn + 4% Oleic acid + 600 ppm Irg. 1010 | 70 | 190 | 210 |
| 67 | Unst. PP + 50 ppm Fe + 4% Oleic acid + 600 ppm Irg. 1010 | 70 | 190 | 330 |
| 68 | 5A95 PP + 50 ppm Mn + 2% Linseed oil + 2% Linolenic acid | 95 | 210 | 355 |
| 69 | 5A95 PP + 50 ppm Mn + 4% Linseed oil | 95 | 190 | 355 |
| 70 | 5A95 PP + 50 ppm Mn + 4% Linolenic acid | 165 | 230 | 240 |
| 71 | 1550P LDPE/5A95 PP (66:30) + 50 ppm Mn + 2% Linseed oil + 2% Stearic acid | 165 | 360 | >350 |
| 72 | 1550P LDPE/5A95 PP (66:30) + 50 ppm Mn + 4% Oleic acid | 190 | >350 | 360 |
| 73 | 1550P LDPE/5A95 PP (76:20) + 50 ppm Mn + 4% Oleic acid | 210 | 240 | >350 |
| 74 | 1550P LDPE/5A95 PP (86:10) + 50 ppm Mn + 4% Oleic acid | 210 | 360 | >350 |
| 75 | 1550P LDPE/5A95 PP (76:20) + 50 ppm Mn + 2% Linseed oil + 2% Stearic acid | 220 | >350 | >350 |
| 76 | 1550P LDPE/5A95 PP (86:10) + 50 ppm Mn + 2% Linseed oil + 2% Stearic acid | 230 | >350 | >350 |
| 77 | 5A95 PP + 4% Oleic acid | 355 | 210 | 360 |
| 78 | 5A95 PP + 50 ppm Mn + 4% Tung Oil | 360 | >350 | >350 |
| 79 | 5A95 PP + 50 ppm Mn + 4% Coconut Oil | >350 | >350 | >350 |

1 Irganox 1010 is a hindered phenol available from Ciba-Geigy Co.

Table 6 shows the embrittlement time for Examples 63-79 samples in a dry oven.

TABLE 6

| Ex. No. | Composition | 88° C. Hrs. | 70° C. Hrs. | 60° C. Hrs. | 49° C. Hrs. |
|---|---|---|---|---|---|
| 63 | 5A95 PP + 50 ppm Mn + 4% Erucic acid | 3 | 7.5 | 25 | 55 |
| 64 | 5A95 PP + 50 ppm Mn + 2% Linseed oil + 2% Erucic acid | 2 | 7 | 28 | 58 |
| 65 | 5A95 PP + 50 ppm Mn + 4% Oleic acid | 2 | 6 | 21 | 52 |
| 66 | Unst. PP + 50 ppm Mn + 4% Oleic acid + 600 Irg. 1010 | 3.75 | 7.5 | 26 | 55 |
| 67 | Unst. PP + 50 ppm Fe + 4% Oleic acid + 600 Irg. 1010 | 23 | 33 | 80 | 123 |
| 68 | 5A95 PP + 50 ppm Mn + 2% Linseed oil + 2% Linolenic acid | 2.5 | 8 | 26 | 65 |
| 69 | 5A95 PP + 50 ppm Mn + 4% Linseed oil | 3.5 | 10 | 34 | 65 |
| 70 | 5A95 PP + 50 ppm Mn + 4% Linolenic acid | 2.5 | 7 | 23 | 55 |
| 71 | 1550P LDPE/5A95 PP (66:30) + 50 ppm Mn + 2% Linseed oil + 2% Stearic acid | 20 | 33 | 315 | 244 |
| 72 | 1550P LDPE/5A95 PP (66:30) + 50 ppm Mn + 4% Oleic acid | 9.5 | 33 | 130 | 148 |
| 73 | 1550P LDPE/5A95 PP (76:20) 50 ppm Mn + 4% Oleic acid | 27 | 100 | 267 | 225 |
| 74 | 1550P LDPE/5A95 PP (86:10) + 50 ppm Mn + 4% Oleic acid | 50 | 172 | 320 | 560 |
| 75 | 1550P LDPE/5A95 PP (76:20) + 50 ppm Mn + 2% Linseed oil + 2% Stearic acid | 27 | 123 | 219 | 267 |
| 76 | 1550P LDPE/5A95 PP (86:10) + 50 ppm Mn + 2% Linseed oil + 2% Stearic acid | 50 | 130 | 130 | >560 |
| 77 | 5A95 PP + 4% Oleic acid | 25.5 | 90 | 95 | 155 |
| 78 | 5A95 PP + 50 ppm Mn + 4% Tung Oil | 3 | 16 | 58 | 123 |
| 79 | 5A95 PP + 50 ppm Mn + 4% Coconut Oil | 6 | 27 | 99 | 155 |

EXAMPLES 80-94

These films (4 mil caliper) were prepared in accordance with Examples 1-14 with the exception of Examples 83-89 which were 1 mil films (25.4 micrometers). The compositions included various naturally biodegradable polymers (Tone TM P-700 and Tone TM 767P are poly-e-caprolactones (PCL) available from Union Carbide of Danbury, Conn.; Bipol TM PHBV is a poly(-hydroxybutyrate valerate) (12% valerate) available from ICI Americas, Inc.; Vinex TM 2025 and 2025U are polyethylene/vinyl-alcohol copolymers available from Air Products & Chemicals, Inc. of Allentown, Pa.; Elvax TM 260 is an ethylene/vinyl acetate copolymer (EVA) (28% vinyl acetate and 6 MFI) available from DuPont Co., Wilmington Del.; Nucrel TM 960 is a polyethylene/methylacrylate copolymer (density=0.94, MFI=60) available from DuPont Co. The poly-L-lactide has an intrinsic viscosity of 1.04 and is available from Birmingham Polymers, Inc. The polyesteramide - 10,2 (PEA) has an instrinsic viscosity of 0.7 and is available from 3M Company, St. Paul, Minn., and Pamolyn TM 100 (PAM) is an oleic acid (91%) available from Hercules, Inc., Wilmington, Del.).

Films from Examples 81 and 82 were tested for degradation in water and air as described above at 60° C. The Example 81 films became embrittled at 43 hours in air and 112 hours in water. The Example 82 films became embrittled at 53 hours in air and 332 hours in water. The times to embrittlement in air for Examples 83-94 are given in Table 7 below.

TABLE 7

| Ex. No. | Composition | 88° C. Hrs. | 70° C. Hrs. | 60° C. Hrs. | 49° C. Hrs. |
|---|---|---|---|---|---|
| 83 | 3% POLY-L-LACTIDE + 2% PAM 100 | 72 | 465 | 850 | >850 |
| 84 | 6% POLY-L-LACTIDE + 2% PAM 100 | 152 | 370 | >850 | >850 |
| 85 | 9% POLY-L-LACTIDE + 2% PAM 100 | 80 | 320 | 750 | >850 |
| 86 | 9% PEA-10,2 + 2% PAM 100 | 63 | 365 | >850 | >850 |
| 87 | 5% PCL + 20% 7C50 + 2% PAM 100 | 50 | 130 | 290 | 750 |
| 88 | 5% VINEX 2025U PVA + 20% 7C50 + 2.5% ELVAX 260 EVA + 2% PAM 100 | 50 | 76 | 225 | >850 |
| 89 | 5% PHBV (12% V) + 20% 7C50 + 2.5% ELVAX 260 EVA + 2% PAM 100 | 50 | 225 | 490 | >850 |
| 90 | 20% P700 + 2% PAM 100 | 6 | 24 | 52 | 100 |
| 91 | 20% 2025 PVA + 2% PAM 100 | 60 | 155 | 245 | 370 |
| 92 | 20% PVA + 10% NUCREL 960 + 2% PAM 100 | 50 | 175 | 325 | 465 |
| 93 | 20% PVA + 10% ELVAX 260 + 2% PAM 100 | 225 | 175 | 290 | 465 |
| 94 | 20% PHBV + 10% ELVAX 260 + 2% PAM 100 | — | — | — | — |

EXAMPLES 80-82

| 80) | Shell 5A95 | 88.94% |
|---|---|---|
| | Tone P-700 | 10.00% |
| | Tung Oil | 1.00% |
| | Manganese (Mn) Stearate | 0.06% |
| 81) | Shell 5A95 | 85.94% |
| | Tone 767P | 10.00% |
| | Pamolyn TM 100 | 4.00% |
| | MnStearate | 0.06% |
| 82) | Shell 5A95 | 85.94% |
| | Bipol TM PHBV | 10.00% |
| | Pamolyn TM 100 | 4.00% |
| | MnStearate | 0.06% |

Examples 82 was of poor quality because of the incompatability of PHBV with polyolefins.

EXAMPLES 83-89

(1 mil LDPE Films)

| 83) | Tenite TM 1550P | 94.94% |
|---|---|---|
| | poly-L-lactide | 3.00% |
| | Pamolyn TM 100 | 2.00% |
| | MnStearate | 0.06% |
| 84) | Tenite TM 1550P | 91.94% |
| | poly-L-lactide | 6.00% |
| | Pamolyn TM 100 | 2.00% |

-continued

|  |  |  |
|---|---|---|
|  | MnStearate | 0.06% |
| 85) | Tenite 1550P | 88.94% |
|  | poly-L-lactide | 9.00% |
|  | Pamolyn TM 100 | 2.00% |
|  | MnStearate | 0.06% |
| 86) | Tenite TM 1550P | 88.94% |
|  | polyesteramide-10,2 | 9.00% |
|  | Pamolyn TM 100 | 2.00% |
|  | MnStearate | 0.06% |
| 87) | Tenite TM 1550P | 72.94% |
|  | Tone P-700 | 5.00% |
|  | Shell 7C50 PP/PE copolymer | 20.00% |
|  | Pamolyn TM 100 | 2.00% |
|  | MnStearate | 0.06% |
| 88) | Tenite TM 1550P | 72.94% |
|  | Vinex TM 2025U | 5.00% |
|  | Shell 7C50 PP/PE | 17.50% |
|  | Elvax TM 260 | 2.50% |
|  | Pamolyn TM 100 | 2.00% |
|  | MnStearate | 0.06% |
| 89) | Tenite TM 1550P | 72.94% |
|  | Bipol TM PHBV | 5.00% |
|  | Shell 7C50 | 17.50% |
|  | Elvax TM 260 | 2.50% |
|  | Pamolyn TM 100 | 2.00% |
|  | MnStearate | 0.06% |

EXAMPLES 90-04

(4 mil PP/PE copolymer films)

| 90) | Shell 7C50 | 78.35% |
|---|---|---|
|  | Tone TM P-700 | 19.59% |
|  | Pamolyn TM 100 | 2.00% |
|  | MnStearate | 0.06% |
| 91) | Shell 7C50 | 78.35% |
|  | Vinex TM 2025 | 19.59% |
|  | Pamolyn TM 100 | 2.00% |
|  | MnStearate | 0.06% |
| 92) | Shell 7C50 | 68.56% |
|  | Vinex TM 2025 | 19.59% |
|  | Nucrel TM 960 | 9.79% |
|  | Pamolyn TM 100 | 2.00% |
|  | MnStearate | 0.06% |
| 93) | Shell 7C50 | 68.50% |
|  | Vinex TM 2025U | 19.59% |
|  | Elvax TM 260 | 9.79% |
|  | Pamolyn TM 100 | 2.00% |
|  | MnStearate | 0.06% |
| 94) | Shell 7C50 | 82.95% |
|  | Bipol TM PHBV | 10.00% |
|  | Elvax TM 260 | 5.00% |
|  | Pamolyn TM 100 | 2.00% |
|  | MnStearate | 0.06% |

EXAMPLES 95-98

Films were prepared and tested as described above for Examples 1-14, using unstabilized polypropylene with 2% added Pamolyn TM 100 and 400 ppm Fe (as Fe Stearate) at various levels of Irganox TM 1010. The films were tested for embrittlement at various temperatures as indicated in Table 8 below.

TABLE 8

| Example | Irganox TM (PPM) | 88° C. Hrs. | 70° C. Hrs. | 60° C. Hrs. | 49° C. Hrs. |
|---|---|---|---|---|---|
| 95 | 0 | 4 | 13 | 40 | 96 |
| 96 | 200 | 7.5 | 34 | 96 | 215 |
| 97 | 600 | 20 | 80 | 260 | 650 |
| 98 | 1000 | 39 | 215 | 1500 | — |

The films were also kept on a she)f at room temperature for approximately 3,900 hours and tested for embrittlement. The Examples 95 and 96 films had embrittled at this time, but the Examples 97 and 98 films had not.

EXAMPLES 99-101

Immature compost was allowed to dry until it contained only 5% water. To 1000 g of this compost were added 200 g of dried, shredded maple leaves, 6 g of Compost Plus (Ringer Corporation, Minneapolis, Minn.) and sufficient water to yield of mixture of 54% water. The compost mixture was placed in a wire mesh basket in a Nalgene tank (Nylon - 14"×10"×10" from Fisher) in a forced air oven at 50° C. The compost was aerated from the bottom by suspending the wire basket over two glass frits (10"×1.5") in a pool of water through which air was bubbled. The compost mixture containing the film sample was piled in the wire basket so that the samples were completely covered. Several samples could be tested in one such apparatus.

The test period was one month. The initial carbon-to-nitrogen ratio of the compost mixture was 40:1. The pH of the system remained relatively neutral, ranging from 5.5-7.0. Moisture was maintained at 45-55% by adding water as necessary. The compost was manually turned daily and film samples were checked for embrittlement. Embrittlement was not as pronounced in the simulated compost test as it was in the dry oven tests however roughly correlated to the water jar test results. Films usually tore first in one direction, and then both, before becoming brittle. Embrittlement times for Examples 99-101 are listed in Table 9 below.

TABLE 9

| Example | Film | Compost 50° C. |
|---|---|---|
| 99 | 5A95PP + 50 ppm Co + 4% Oleic Acid | 10 days |
| 100 | Unstab. 5A95PP + 50ppm Mn + 4 Oleic acid | 27 days |
| 101 | 5A95PP/Tone TM 767P PCL (9:1) + 50 ppm Mn + 4% Oleic Acid | 26 days |

The various modifications and alterations of this invention will be apparent to those skilled in the art without departing from the scope and spirit of this invention, and this invention should not be restricted to that set forth herein for illustrative purposes.

We claim:

1. An extrudable compostable polymer composition comprised of an extrudable thermoplastic polymer, copolymer or blends containing a prodegradant system of an auto-oxidative component comprising a fatty acid, substituted fatty acid or derivatives, or blends thereof, the fatty acid having 10 to 22 carbon atoms, said auto-oxidative component being at between about 0.1 to 10 weight percent based on the total composition wherein the auto-oxidative component provides at least 0.1 weight percent of unsaturated species and at least 0.1 weight percent of free acid species in the total composition, and from 5 to 500 ppm of a transition metal in the form of a salt wherein the transition metal is selected from the group consisting of cobalt, manganese, copper, cerium, vanadium and iron wherein, in a film form of about 4.0 mils, the composition will oxidatively degrade to embrittlement within about 14 days at a temperature of 60° C. and a relative humidity of at least 80%

2. The polymer composition of claim 1 wherein the auto-oxidative component comprises an unsaturated fatty acid.

3. The polymer composition of claim 1 wherein the transition metal salt comprises a transition metal salt having an organic ligand.

4. The polymer composition of claim 1 wherein the auto-oxidative component comprises an admixture of saturated fatty acids and unsaturated fatty acid esters.

5. The polymer composition of claim 2 wherein the unsaturated fatty acid substantially comprises species having two or more double bonds.

6. The polymer composition of claim 4 wherein the unsaturated fatty acid ester substantially comprises species having two or more double bonds.

7. The polymer composition of claim 1 wherein the transition metal is present at a concentration of less than 200 parts per million.

8. The polymer composition of claim 1 further comprising an anti-oxidant at a concentration of from about 0.02 to 0.2 weight percent.

9. The polymer composition of claim 8 further comprising a naturally biodegradable thermoplastic polymer at a concentration of from about 5 to 50 weight percent.

10. The polymer composition of claim 1 wherein the extrudable thermoplastic polymer comprises a polyolefin polymer, copolymer or blend.

11. The polymer composition of claim 10 wherein the polyolefin comprises polypropylene.

12. The polymer composition of claim 10 wherein the polyolefin comprises polyethylene.

13. The polymer composition of claim 4 wherein the unsaturated fatty acid esters are present as a natural oil.

14. The polymer composition of claim 13 wherein the natural oil comprises tung oil, linseed oil or fish oils in a concentration greater than 0.5%.

15. The polymer composition of claim 11 wherein the auto-oxidative component comprises at least 0.5 weight percent of the composition.

16. The polymer composition of claim 4 wherein the saturated fatty acid is present at a concentration greater than 0.5%.

17. The polymer composition of claim 1 further comprising 5 to 15 weight percent of a naturally biodegradable polymer.

18. The polymer composition of claim 1 further comprising 5 to 25 weight percent of a naturally biodegradable polymer.

19. The polymer composition of claim 17 wherein the naturally biodegradable polymer is selected from the group consisting of poly(caprolactone), poly(lactic acid), poly(hydroxybutyrate-valerate), poly(ethylene adipate), poly(vinyl alcohol), modified starch/olefin copolymers, poly(propylene oxide), and poly(ethylene oxide).

20. The polymer composition of claim 1 wherein the transition metal is selected from the group consisting of cobalt, manganese, copper and cerium.

21. The polymer composition of claim 20 wherein the transition metal is present at a concentration of less than 200 parts per million.

22. A film comprising at least one layer of a thermoplastic polymer containing a prodegradant system of an auto-oxidative component comprising a fatty acid, substituted fatty acid or derivatives, or blends thereof, the fatty acid having 10 to 22 carbon atoms, said auto-oxidative component being at between about 0.1 to 10 weight percent based on the total composition wherein the auto-oxidative component provides at least 0.1 weight percent of unsaturated species and at least 0.1 weight percent of free acid species in the total composition, and from 5 to 500 ppm of a transition metal in the form of a salt wherein the transition metal is selected from the group consisting of cobalt, manganese, copper, cerium, vanadium and iron wherein, in a film form of about 4.0 mils, the film will oxidatively degrade to embrittlement within about 14 days at a temperature of 60° C. and a relative humidity of at least 80%.

23. The film of claim 22 wherein the auto-oxidative component comprises an unsaturated fatty acid.

24. The film of claim 22 wherein the auto-oxidative component comprises an admixture of saturated fatty acids and unsaturated fatty acid esters.

25. The film of claim 23 wherein the unsaturated fatty acid substantially comprises species having two or more double bonds.

26. The film of claim 22 wherein the transition metal is selected from the group consisting of cobalt, manganese, copper and cerium and is present at a concentration of less than 200 parts per million.

27. The film of claim 22 further comprising an anti-oxidant at a concentration of from about 0.02 to 0.2 weight percent.

28. The film of claim 27 further comprising biodegradable thermoplastic polymer at a concentration of from about 5 to 50 weight percent.

29. The film of claim 22 wherein the extrudable thermoplastic polymer comprises a polyolefin polymer, copolymer or blend.

30. The film of claim 29 wherein the polyolefin comprises polypropylene.

31. The film of claim 22 wherein the polyolefin comprises polyethylene.

32. The film of claim 22 wherein the auto-oxidative component comprises at least 0.5 weight percent of the composition.

33. The polymer composition of claim 8 wherein the composition will oxidatively degrade to embrittlement within 14 days at 60° C. and a relative humidity of at least 80% when tested after a stable shelf life of from about 1 week to 12 months.

34. The film of claim 8 wherein the film will oxidatively degrade to embrittlement within 14 days at 60° C. and a relative humidity of at least 80% when tested after a stable shelf life of from about 1 week to 12 months.

35. The film of claim 22 further comprising at least one layer without said prodegradant system.

36. The film of claim 31 wherein said at least one layer without said prodegradant system contains degradation additives.

37. The film of claim 31 wherein said at least one layer without said prodegradant system contains no degradation additives.

38. The film of claim 31 wherein said at least one layer without said prodegradant system is a naturally biodegradable polymer.

* * * * *

UNITED STATES PATENT AND TRADEMARK OFFICE
CERTIFICATE OF CORRECTION

PATENT NO. : 5,216,043

DATED : June 1, 1993

INVENTOR(S) : Alan J. Sipinen, Jobst T. Jaeger, Denise R. Rutherford and Elizabeth C. Edblom It is certified that error appears in the above-identified patent and that said Letters Patent is hereby corrected as shown below: On the title page, and Column 1, line 1, In the title, delete "THERMOPHASTIC" and insert
--THERMOPLASTIC--.

Column 13, line 66, delete "she)f" and insert
--shelf--.

Signed and Sealed this

Eighteenth Day of January, 1994

Attest:

BRUCE LEHMAN

Attesting Officer

Commissioner of Patents and Trademarks